(12) United States Patent
Tian et al.

(10) Patent No.: US 7,873,939 B2
(45) Date of Patent: Jan. 18, 2011

(54) PROCESSING LOGIC MODELING AND EXECUTION

(75) Inventors: Zhong Tian, Beijing (CN); Sheng Ye, Beijing (CN); Xin Zhang, Beijing (CN); Jing Li, Beijing (CN); Wei Sun, Beijing (CN); Guan Qun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/126,959

(22) Filed: May 26, 2008

(65) Prior Publication Data

US 2008/0262815 A1    Oct. 23, 2008

(51) Int. Cl.
    *G06F 9/44* (2006.01)
(52) U.S. Cl. ............... 717/101; 717/102; 717/103; 717/104; 717/105
(58) Field of Classification Search ......... 717/101–105, 717/120; 705/7
See application file for complete search history.

(56) References Cited

U.S. PATENT DOCUMENTS

| | | | | |
|---|---|---|---|---|
| 5,437,037 A | * | 7/1995 | Furuichi | 717/146 |
| 5,450,545 A | * | 9/1995 | Martin et al. | 717/140 |
| 5,497,500 A | * | 3/1996 | Rogers et al. | 717/109 |
| 6,226,792 B1 | * | 5/2001 | Goiffon et al. | 717/120 |
| 6,598,219 B1 | * | 7/2003 | Lau | 717/108 |
| 7,051,036 B2 | * | 5/2006 | Rosnow et al. | 717/101 |
| 7,249,042 B1 | * | 7/2007 | Doerr et al. | 705/7 |
| 7,483,841 B1 | * | 1/2009 | Jin et al. | 705/7 |
| 2003/0014409 A1 | * | 1/2003 | Shukoor | 707/7 |
| 2003/0144970 A1 | * | 7/2003 | Coyne | 705/400 |
| 2007/0226678 A1 | * | 9/2007 | Li et al. | 717/101 |

OTHER PUBLICATIONS

Fox, et al. "The Effect of Decision Style on the Use of a Project Management Tool: An Empirical Laboratory Study", 2005, The Data Base for Advances in Information Systems, p. 28-42.*

* cited by examiner

*Primary Examiner*—Wei Y Zhen
*Assistant Examiner*—Qamrun Nahar
(74) *Attorney, Agent, or Firm*—Law Offices of Ira D. Blocker, P.C.

(57) ABSTRACT

Provides processing logic modeling and executing methods, systems and apparatus. These facilitate collaboration between business analyst and IT staff for process modeling and maintenance of the consistency between business level design and IT implementation design. A task is decomposed into sub-tasks and is represented by a tree. Annotations to the nodes of the tree are used to represent the relations between the sub-tasks. A processing logic is thus completed. When executing the processing logic, traversing the tree follows according to the annotations.

18 Claims, 6 Drawing Sheets

```
- <PLETLogic>
    <GUID>260787225298801758626161346690 71438226</GUID>
    <Caption>Root</Caption>
    <Remark>Root</Remark>
  + <General>
  - <Node>
      <GUID>261778715228812235426 12829706933037266</GUID>
      <Caption>InterNode1</Caption>
      <NodeType>0</NodeType>
      <Precondition />
      <Variables />
      <Postcondition />
    - <Children>
      - <Node>
          <GUID>101839444112769092910167 41962205974097</GUID>
          <Caption>InterNode2</Caption>
          <NodeType>1</NodeType>
          <Precondition />
          <Variables />
          <Postcondition />
        - <Children>
          - <ActionNode>
              <GUID>282765967864855230028293 12161865236428</GUID>
              <Caption>Action1</Caption>
            - <ActionID>
                <ServiceName>name</ServiceName>
                <PortName>target</PortName>
                <BindingKey>proc</BindingKey>
                <OperName>desc</OperName>
                <Mode>0</Mode>
              </ActionID>
            - <Precondition>
                <Task>__PLET_INSTANCE_ID__:=1</Task>
              </Precondition>
```

PROCESSING LOGIC MODELING AND EXECUTION

TECHNICAL FIELD

The present application generally relates to processing logic modeling and execution, especially to a processing logic modeling method, a processing logic executing method, a processing logic modeling apparatus and a processing logic executing apparatus.

BACKGROUND OF THE INVENTION

Processing logic represents the procedural steps to accomplish a process or a complex task. Processing logic modeling is a common requirement when describing a process in a structured way or in order to implement it on IT system. To improve the business process's visibility and flexibility for change, business and industries have striven to capture and streamline the business processes.

Well known workflow system has been widely used in this field. Normally it features a directed graph based flow method to describe a structured set of activities designed to produce a specific output. However, such flow model is not easy to understand if the process is complex, especially for business analyst. This brings big gap for process design between business operation level and IT implementation level.

A complex process is not easy to be decomposed to simple atomic processes due to the complicated relationship between entities of a flow model. So there is no clear composition view of key tasks of a process. Prior art includes a software product well known as WBS Chartpro available from Critical Tools, Inc.

WBS Chartpro is a project plan tooling, which could help to plan and display projects' schedule using a tree-style diagram known as a Work Breakdown Structure (WBS) Chart. WBS charts display the structure of a project showing how the project is broken down into summary and detail levels. Plan new projects using an intuitive "top-down" approach or display existing Microsoft Project plans in an easy to understand diagram. Although this application takes use of tree-style diagram to describe a detailed project plan, it is not process description initiative, so it has no capability to streamline the procedure of a process.

As another example, WO 99/60372 (Apparatus and Method for Monitoring and Controlling Laboratory Information and/or Instruments) disclosed a system for facilitating the handling of laboratory information. User could select predetermined task, drag and drop in the tooling interface to build a task sequence in a tree structure, and when running the processor executes the sequence of tasks in turn by reference to the static and dynamic laboratory data. This invention is a domain specific application. Although it also features a tree-style structure to describe a processing logic, it targets to describe sequence processing in the specific domain but has no enough and necessary processing logic modeling capabilities, such as parallel processing, loop and sub-logic support.

Again an example. U.S. Pat. No. 6,092,048 (Task Execution Support System) disclosed a task execution support system which supports the user to execute a task in accordance with the progress of task process listed-up as network type flow. A task management server includes a memory unit for memorizing task information, an action entry comprising a task, an event rule and a main task and sub-task structure, and each of a plurality of client machines includes a task information display/operation unit which enables each user to operate information during a task is executed. In the modeling method in this invention, the sub-tasks structure could only be sequential, no parallel, and it's processing logic modeling tool is more like a task registration interface and has no extensive editing function.

SUMMARY OF THE INVENTION

To solve these problems, an aspect of the invention is to provide processing logic modeling and executing methods and apparatus, to facilitate collaboration between business analyst and IT staff for process modeling and maintenance of the consistency between business level design and IT implementation design.

An aspect of the invention provides a processing logic modeling method for modeling a task. An example of the method includes: a decomposing step for decomposing said task into at least one level of sub-tasks; a tree structure forming step for forming a tree structure from said task and various levels of sub-tasks resulted from decomposing the task; an annotating step for, according to the relations between the sub-tasks, annotating the nodes of the tree, thus obtaining a processing logic model for performing said task.

Correspondingly, the invention provides a method for executing the processing logic, established according to the method given above, comprising: traversing the tree according to the annotations, and performing the leaf nodes of the tree according to the annotations, thus completing the execution of the task.

An aspect of the invention further provides a processing logic modeling apparatus that may apply the above method, for modeling a task, comprising an editor and an interpreter, for mapping the tree and the annotations into script of the processing logic, the editor comprising: a tree editor for editing a tree corresponding to a processing logic and showing how the task is decomposed into at least one level of sub-tasks, and annotation editor for editing annotations for the nodes of the tree, the annotations representing the relations between the nodes of various levels.

BRIEF DESCRIPTION OF THE DRAWINGS

Other aspects, features and advantages of the invention will become more apparent after reading the following detailed description of advantageous embodiments. The accompanying drawings, which are incorporated in and constitute a part of the specification, illustrate embodiments of the invention and, together with the description, serve to explain the principles of the invention. In the drawings.

DETAILED DESCRIPTION OF THE INVENTION

The present invention provides processing logic modeling and executing methods, systems and apparatus, to facilitate collaboration between business analyst and IT staff for process modeling. while maintaining the consistency between business level design and IT implementation design. To this end, the invention adopts a strategy of divide-and-conquer to decompose a task into sub-tasks and express it in form of a tree, use annotations to the nodes of the tree to represent the relations between the sub-tasks, and thus complete a processing logic. When executing the processing logic, the tree is traversed according to the annotations. The traversing includes depth-first traversing and broadness-first traversing. The executing apparatus automatically select the depth-first traversing algorithm or the broadness-first traversing algorithm according to the annotations to the nodes, and thus execute the predetermined processing logic.

Specifically, the invention provides a processing logic modeling method for modeling a task, comprising: a decomposing step for decomposing said task into at least one level of sub-tasks; a tree structure forming step for forming a tree structure from said task and various levels of sub-tasks resulted from decomposing the task; an annotating step for, according to the relations between the sub-tasks, annotating the nodes of the tree, thus obtaining a processing logic model for performing said task.

In the invention, the leaf nodes of the tree can include only one action or sub-logic node, wherein, the action node corresponds to atomic action program that could be invoked, and the sub-logic node corresponds to sub-logic that could be invoked. The action nodes and the sub-logic nodes may only define normative interface description. Only when to be executed, will the implementation modules (applications, services, parts, and etc.) of the action or the sub-logic be bound to the action or sub-logic nodes, as long as the action or the sub-logic could provide interface specification complying with that defined by the nodes. Consequently, it is sufficient for the logic designing staff to define the functions and the interfaces of the action nodes or the sub-logic nodes, and the action or the sub-logic may be implemented in various ways. Therefore, the design and implementation of logic will be more flexible. That is, such capability of "delayed binding" enables the logic designing staff to have more freedom to select or change the implementation modules of the actions or sub-logics.

The annotations may comprising at least one of the following: precondition defining the condition to be met for performing the corresponding node; postcondition defining the condition to be met for leaving the corresponding node; pre-task defining the task to be performed before performing the corresponding node; post-task defining the task to be performed before leaving the corresponding node; and the type of intermediate node, stipulating whether the children of the intermediate node should be performed sequentially or in parallel.

Correspondingly, the invention provides a method for executing the processing logic established according to above method, comprising: traversing the tree according to the annotations, and performing the leaf nodes of the tree according to the annotations, thus completing the execution of the task.

The invention further provides a processing logic modeling apparatus that may apply the above method, for modeling a task, comprising an editor and an interpreter, for mapping the tree and the annotations into script of the processing logic, the editor comprising: a tree editor for editing a tree corresponding to a processing logic and showing how the task is decomposed into at least one level of sub-tasks, and annotation editor for editing annotations for the nodes of the tree, the annotations representing the relations between the nodes of various levels.

In the apparatus, the tree editor and the annotation editor may represent the tree and the annotations with graphics. Correspondingly, the interpreter may comprises means for mapping a predetermined graphical element into a predetermined script section. The apparatus may further comprises a debugger for simulatively performing the processing logic, either automatically or manually, either globally or locally, so as to find out and display the potential bug in the resulted processing logic.

Corresponding to the above-mentioned processing logic modeling apparatus, the invention provides a processing logic executing apparatus, characterized in comprising a identifying means, which is capable of identifying the processing logic represented by the tree established by the above-mentioned processing logic modeling apparatus and the nodes of the tree, so that the executing apparatus traverses the tree according to the logic script and executes the processing logic.

Advantageous embodiments of the present invention will now be described with reference to the accompanied drawings. Note that throughout the specification including the drawings, identical or corresponding parts are denoted with like reference signs. Divide-and-conquer is one of the most widely used strategies for problem solving, that is, a task would often be divided into sub-tasks. If any of the sub-tasks is too complex to address, further sub-division is done until all of them are ready to be attacked. Divide-and-conquer strategy gives a nice sub-tasks tree structure to define a complex task to be solved. However, as discussed in the background of the invention, a conventional tree has no complete capability for logic modeling. In the present invention, annotations to the nodes of a tree are used to express the transition relations between the sub-tasks contained in a complex task.

Figure 1:
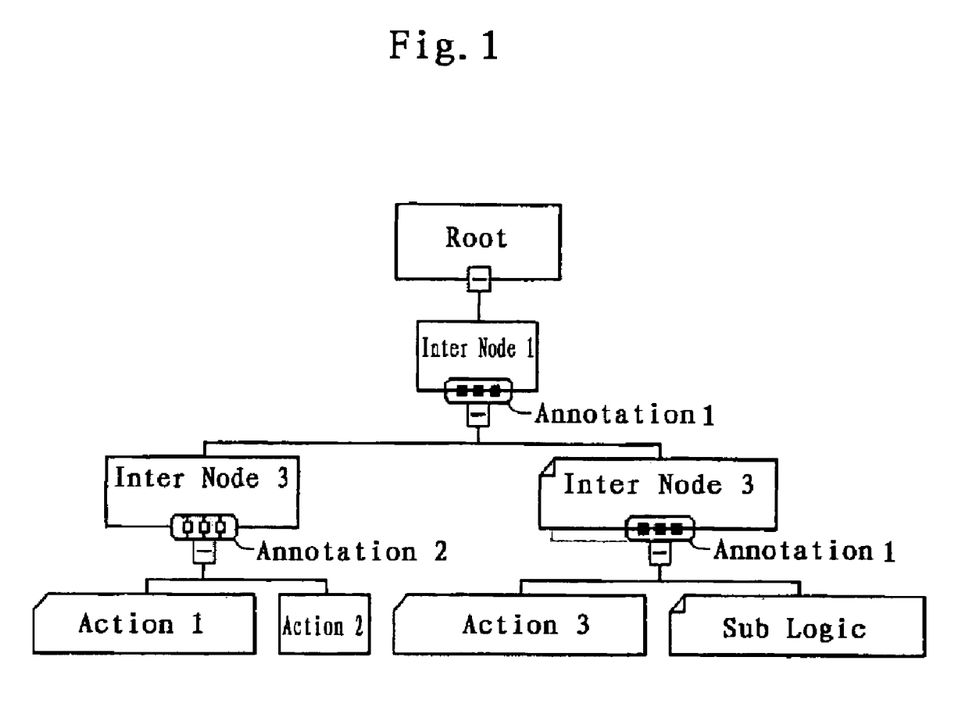
FIG. 1 is a schematic view of a logic tree established according to the invention.

FIG. 1 is a schematic view of an exemplary logic tree used in the present invention. As illustrated in FIG. 1, there are 3 node types in a processing: root node, intermediate node and leaf node. In the present invention, the leaf node may be action node or sub-logic node. These nodes have corresponding elements which could be used to model complex logic and define execution rules. Root node is the root element, it contains global information of the processing logic to be designed, such as logic ID, version, parameters, and it could only has one child, this child must be an intermediate node, such as InterNode1 shown in the drawing.

An intermediate node can has one or more children. The children can be intermediate node, action node or sub-logic node. According to the invention, annotation may be attached to the intermediate nodes. For example, annotation may be used to define the type of an intermediate node, and thus determine the behaviour of its children: to be executed in sequence or in parallel. For example, as shown in FIG. 1, the small squares below the intermediate nodes represent the types of the intermediate nodes: the Annotation 1 represented by the black squares shows that the children of the corresponding intermediate node should be executed sequentially, and the Annotation 2 represented by the blank squares shows that the children of the corresponding intermediate node should be executed in parallel. Apparently, any other graphic elements may be used to represent said annotations. During execution, the type of the intermediate node will automatically determine to adopt a depth-first traverse algorithm or a broadness-first traverse algorithm. If the attribute of an intermediate node is "sequentially executing", then its children are traversed with a depth-first traverse algorithm; or if the attribute of an intermediate node is "executing in parallel", then its children are traversed with a broadness-first traverse algorithm. Furthermore, variable can be defined in an intermediate node, and these variables can be used by the intermediate node and it's children.

Sub-logic node calls another processing logic. It will prepare the arguments for the sub-logic invocation. In processing logic, variable parameters are used, so the input arguments must be defined by variable names. The variable should be defined in any of its parent node (intermediate node). In sub-logic, these variables may be changed, and it will reflect to the parent logic's context. So sub-logic node has no return values, it uses variable parameters to pass value changes back to the parent logic.

Action node calls existing action program to execute an action. Action node will prepare the arguments for the action and get the return value from the action. Here the arguments must use variable name to present the arguments' value. As action node has return values, it does not use variable parameters, but value parameters. Action node could have more than one return values, which can be filled back into the variable space of the logic context respectively.

In addition to the afore-discussed annotations relating to the types of the intermediate nodes, intermediate node, action node and sub-logic node may be annotated according to the relations between corresponding sub-tasks. The annotations may have 4 elements: precondition, postcondition, pre-task and post-task, to control the execution of the nodes.

Figure 6:
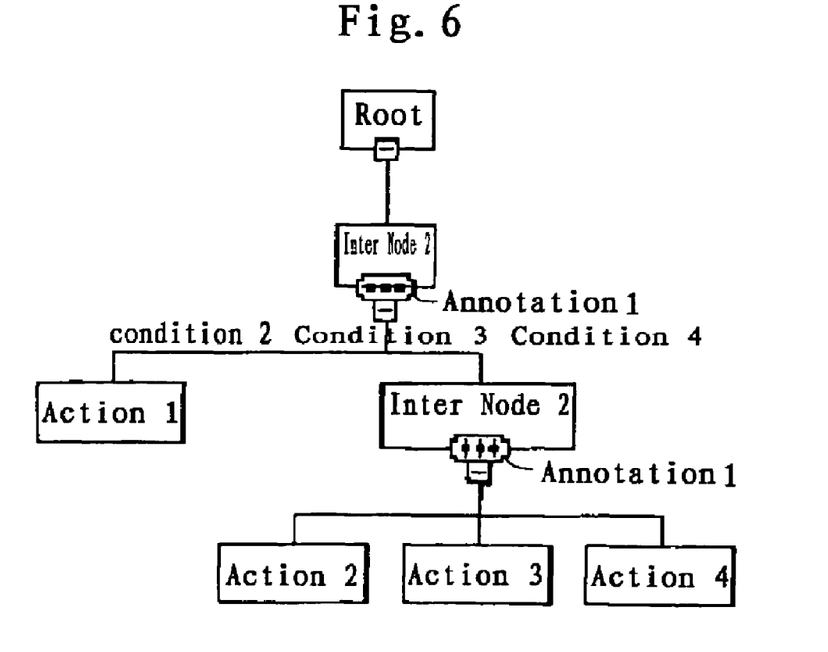
FIG. 6 is a schematic view showing establishing a tree structure and annotating the tree based on the sub-tasks shown in FIG. 5.

Precondition defines the entry condition of the node. If precondition returns false, the node will not be executed. For example, as shown in FIG. 6, a precondition may be used to control the execution of the action nodes Action 2, Action 3 and Action 4. For example, assuming that Action 2 will be executed when an integer a equals to 1, Action 3 will be executed when said integer a equals to 2 and Action 4 will be executed when said integer a is neither 1 nor 2, then for each of Action 2, Action 3 and Action 4, a precondition may be set (not shown in the figure): the precondition of Action 2 is "a=1", the precondition of Action 3 is "a=2" and the precondition of Action 4 is "a <>1 and a <>2. Thus, when the branch tree of the intermediate node InterNode2 is traversed, if a=1, then the precondition of Action 2 is true and Action 2 will be executed, and the preconditions of Action 3 and Action 4 are false and Action 3 and Action 4 will not be executed.

Postcondition is used for checking execution state. It can be used to, for example, implement loop process. For example, assuming that a variable b has an initial value "0" and will be incremented every time a node is executed. By saying "a node is executed", it means, if the node is a leaf node, then the leaf node is executed; if the node is an intermediate node, then the branch tree of the intermediate node is executed. If the postcondition of the node is set as "b>=50", then, when b is smaller than 50, the node (or corresponding branch tree) will be executed; otherwise the postcondition is met and the execution of the node (or corresponding branch tree) is terminated. As a result, the node (or its branch tree) is repeatedly executed 50 times.

Pre-tasks are executed when entering a node. In general pre-task may prepare context and initial variables for the operations of the node. Specifically, Pre-task may prepare data form for the corresponding node, or initialize the variables (that is, assign values to the variables).

Post-tasks are executed when leaving a node. The post-tasks may include setting return value, clearing error state and etc. As a specific example, the post-tasks may write the result of the execution of the corresponding nodes into databases, or record the execution status of the corresponding nodes into the system log.

Figure 2:
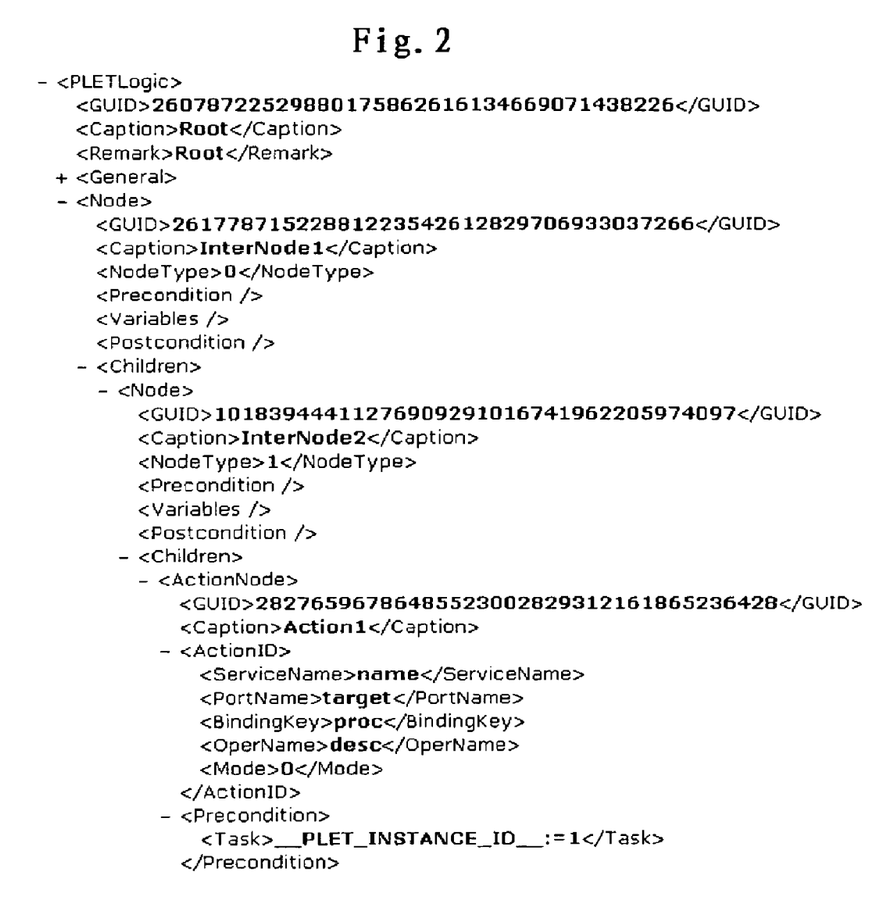
FIG. 2 is a processing logic script corresponding to the tree as shown in FIG. 1.

FIG. 2 shows a processing logic script corresponding to the logic tree shown in FIG. 1. The script is written in XML (extensible marking language). Any person skilled in the art knows that the processing logic may be written in any available language.

With the tree having the above features, it is possible to model most of the processing logic. According to the experiments of the inventors, the invented processing logic has the capability to model most of the EindHoven workflow patterns.

Figure 3:
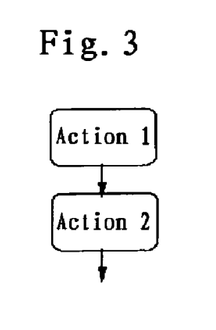
FIG. 3 is a first example showing sub-tasks decomposing according to the invention.
Figure 4:
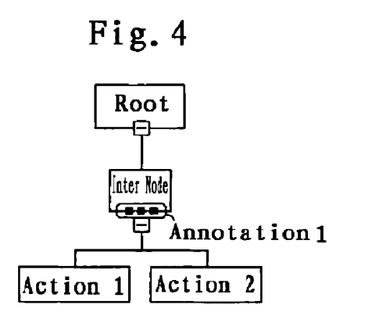
FIG. 4 is a schematic view showing establishing a tree structure and annotating the tree based on the sub-tasks shown in FIG. 3.

Here we use two simple examples to explain the processing logic modeling method and the processing logic modeling apparatus according to the invention. First the task to be solved is analyzed and decomposed into sub-tasks. As illustrated in FIG. 3, if, as a result of the analyzing and decomposing, a task should be fulfilled by performing two actions in sequence, then, according to the invention, the task could be presented as a processing logic tree as shown in FIG. 4. The intermediate node represents the problem to be solved, which could be divided into two sequential sub-tasks, Action 1 and Action 2. According to the invention, to model the processing logic, the nodes of the tree are to be annotated appropriately. In the present example, Action 1 and Action 2 are to be executed sequentially. Therefore, their parent node, that is said intermediate node, is attached Annotation 1 stipulating that the children shall be executed sequentially.

When executing the processing logic, said tree is traversed. The traversing first reaches the intermediate node. Based on the type of the intermediate node represented by the Annotation 1, it is determined that the intermediate node's children shall be executed sequentially. Consequently, with respect to the children, that is, leaf nodes Action 1 and Action 2, a depth-first traversing algorithm is performed to complete said task.

Figure 8:
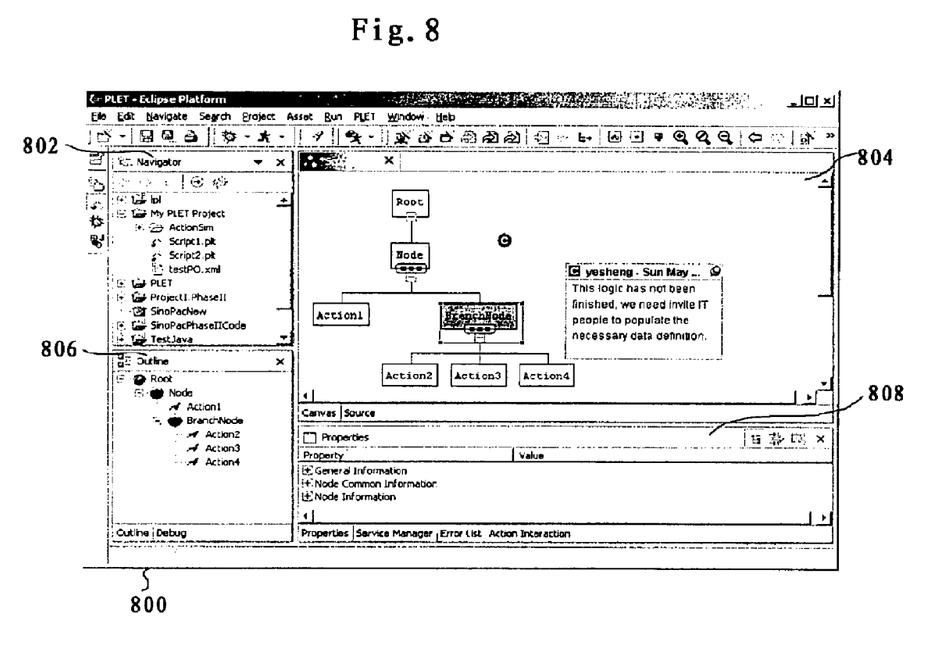
FIG. 8 is an exemplary visual interface of the processing logic modeling apparatus as shown in FIG. 7.

A person skilled in the art knows that it is not important what is the visual appearance of the tree shown in FIG. 4, and the tree is a logic tree in nature. In fact, the tree may be in any form, such as in the form of a logic script as shown in FIG. 2, or in the form of the outline as shown in FIG. 8, which will be described below.

Figure 5:
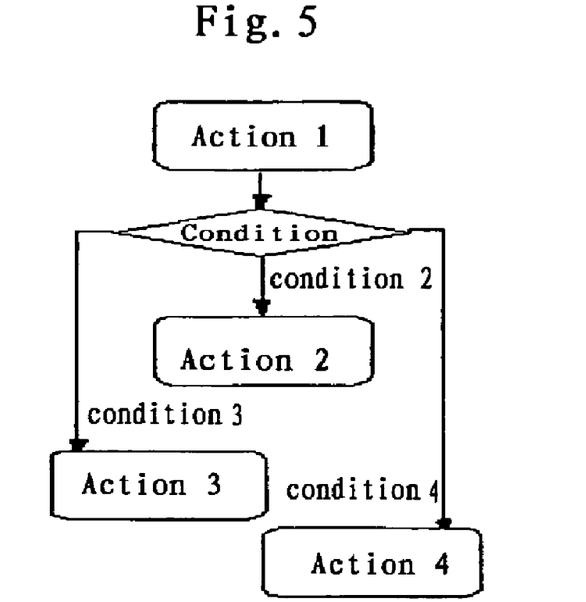
FIG. 5 is a second example showing sub-tasks decomposing according to the invention.

Another example will be discussed below. As illustrated in FIG. 5, through analyzing, it is known that to fulfill a task, Action1 should be performed first, and then according to the condition evaluation result, Action2 or Action3 or Action4 would then be performed.

The task could be presented as a processing logic tree in FIG. 6. In the drawing, the intermediate node InterNode 1 represents the problem to be solved, which could be divided into two sequential sub-tasks, Action1 and InterNode 2. The InterNode 2 has three parallel sub-tasks, Action2, Action3, and Action4. Each of these three sub-tasks has a precondition definition as discussed above, and if the precondition is satisfied, then the corresponding action would then be performed.

According to the invention, to model the processing logic, the nodes of the tree are to be annotated appropriately. In the present example, Action 1 and InterNode 2 are to be executed sequentially. Therefore, their parent node, that is InterNode 1, is attached Annotation 1 stipulating that the children shall be executed sequentially. Similarly, the InterNode 2 is attached Annotation 2 stipulating that its children shall be executed in parallel. The rest of the action nodes are attached precondition annotations for checking whether the above-mentioned three conditions are met, respectively.

When executing the processing logic, the tree is traversed. The traversing first reaches the intermediate node InterNode 1. Based on the type of the intermediate node represented by the annotation, it is determined that the intermediate node's children shall be executed sequentially. Consequently, with respect to the children, that is, leaf node Action 1 and intermediate node InterNode 2, a depth-first traversing algorithm is performed. Based on the type of the intermediate node InterNode 2 represented by the annotation, it is determined that the intermediate node's children shall be executed in parallel. Consequently, with respect to the children, that is, leaf nodes Action 2, Action 3 and Action 4, a broadness-first traversing algorithm is performed. When executing the three leaf nodes, first checking their preconditions, and only when their preconditions are met, respectively, will the respective action nodes be executed. Thus the task is completed.

Above discussed are only two simple examples for illustrating the principle of the invention. In fact, any annotation may be attached to any node to achieve a particular object. For example, by setting postconditions for any desired leaf nodes or intermediate nodes, the recursion execution of the corresponding leaf node or branch tree could be realized for fulfilling a loop process requirement. And communication mechanism for leaf node's interaction could be designated in the annotations, and so on. All of these make the invented method capable of describing a complex graph type flow.

Corresponding to the method of the invention, the invention further provides a processing logic modeling apparatus, which could be implemented in a computer or any other form of computing device.

Figure 7:
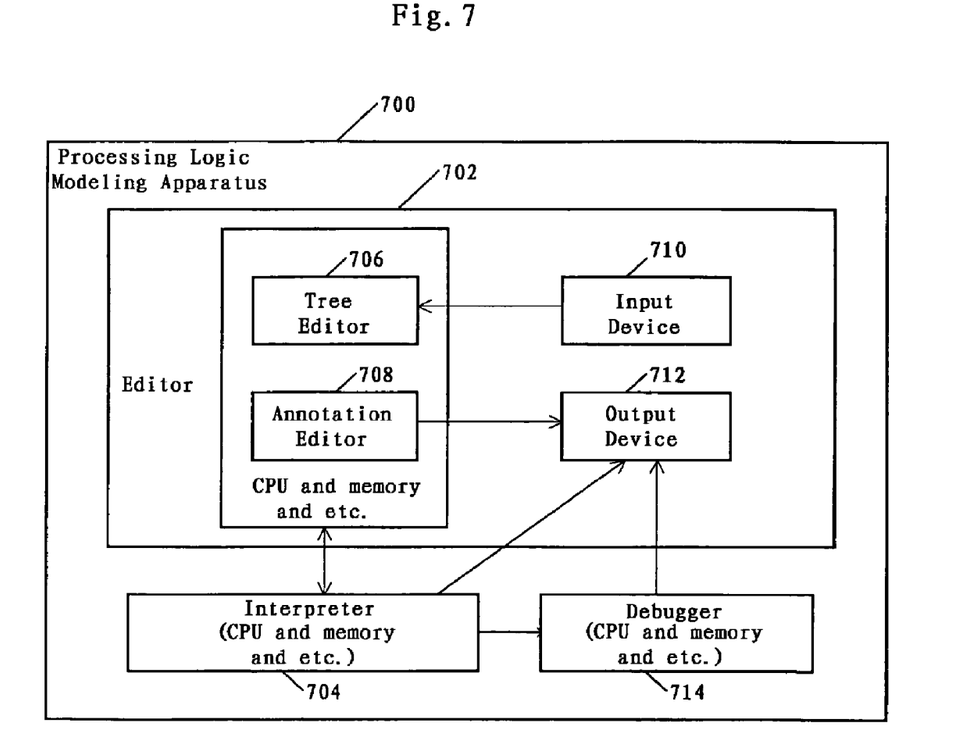
FIG. 7 is a block view showing a processing logic modeling apparatus of the invention.

As shown in FIG. 7, a processing logic modeling apparatus 700 essentially comprises an editor 702 and an interpreter 804, both of which may be realized in the microprocessor such CPU and the like and memory device of a computing device. The editor further comprises input device(s) 710 and output device(s) 712. The editor includes a tree editor 706 and an annotation editor 708, through which, and through the input device(s) such as a mouse and a keyboard and the output device(s) such as a display, a tree and annotations to the nodes of the tree may be edited according to the method as discussed above. The interpreter 704 functions to map the tree and the annotations to the nodes thereof into processing logic script.

As discussed above, the tree and the annotations may be manifested in any form. The most convenient form is graphic form. Specifically, the annotations may be formatted text, or graphics with text, and the like. Obviously, a person skilled in the art will appreciate that the tree and the annotations may be in any form. Here, assuming various graphic elements are used to express the nodes and their annotations, that is, their attributes. Then, the editor may further comprise a graphical user interface displayed in said output device. In the interface, various graphical elements, such as elements relating to the tree structure and elements relating to the annotations (such as, as discussed above, the blank and black squares, graphical elements representing the precondition "a=1" and having the text "a=1" or the like, and etc.), may be provided in advance or may be defined by the user. Each graphical element corresponds to a particular segment of the processing logic script. Then, every time a new graphical element is added into the tree, for example, by dragging a particular graphical element in a graphical element library and dropping it to a proper position in the tree with a mouse, the interpreter will add a corresponding script segment into the processing logic script. For, example, the graphical element representing a precondition may be positioned above the graphical element of the corresponding node, and the graphical element representing a postcondition may be positioned below the graphical element of the corresponding node. As a result, as the tree and the annotations are edited, the processing logic script is generated dynamically.

A person skilled in the art may conduct the graphical editing with any graphical editing means. The operation of mapping the graphical elements to the script segments also belongs to conventional technical means.

FIG. 8 shows an exemplary user interface 800 of the processing logic modeling apparatus of the invention. The window contains 4 parts, Navigator 802, Editor 804, Outline 806 and Property Page 808. The data model of the designed logic would be synchronized among these four different windows.

A set of graphic editing facilities are provided in the Editor and may be embodied in the main menu and the tool bars, and allow the user to visually design the processing logic by drawing a tree structure to illustrate how a relatively complex task is decomposed into sub-tasks. A node of the tree represents a sub-task, which can also be divided into several smaller sub-tasks, while the leaves are the final "atomic" actions. Properties on the tree, such as the data, transition rule, corresponding action programs, can be associated with each node and leaf. The various graphical elements as discussed above may be provided in the form of menu or tool bars in the prior art editor, and may be defined by the user. The interpreter as discussed above (not manifested in the graphic user interface) can dynamically map the logic graph into processing logic script such as in XML format. To facilitate action reference, is also provided an interface to retrieve action program registration information from an action library.

To serve the objective for business executive review, the Editor provides strong capability of making comments. User could make comments on every node, and also could make general comments as sticky note on the drawing. Property page could be used to set the respective properties' value for every node. Error alert, simulation debugging, deployment related features may also be provided to facilitate the development, debugging and deployment of the processing logic.

To run the processing logic established by the processing logic modeling method and apparatus of the invention, the conventional processing logic executing engine needs to be modified correspondingly. That is, means for identifying and interpreting the annotations as discussed above is necessary. As discussed above, in the processing logic script, said annotations are manifested as code sections in particular format. Thus, the processing logic executing apparatus (engine) traverses the tree according to the structure and the annotations thereof, thus completes the execution of the processing logic.

The environment for processing logic modeling (Design time support) and the environment for processing logic executing (Run time support) are consistent with the prior art except those disclosed in the present disclosure. Therefore, further detailed description thereof is omitted. The following is only a summary, with reference FIG. 9, of the system supporting designing and executing processing logic (Design time support 902 and Run time support 904) and its operation.

Figure 9:
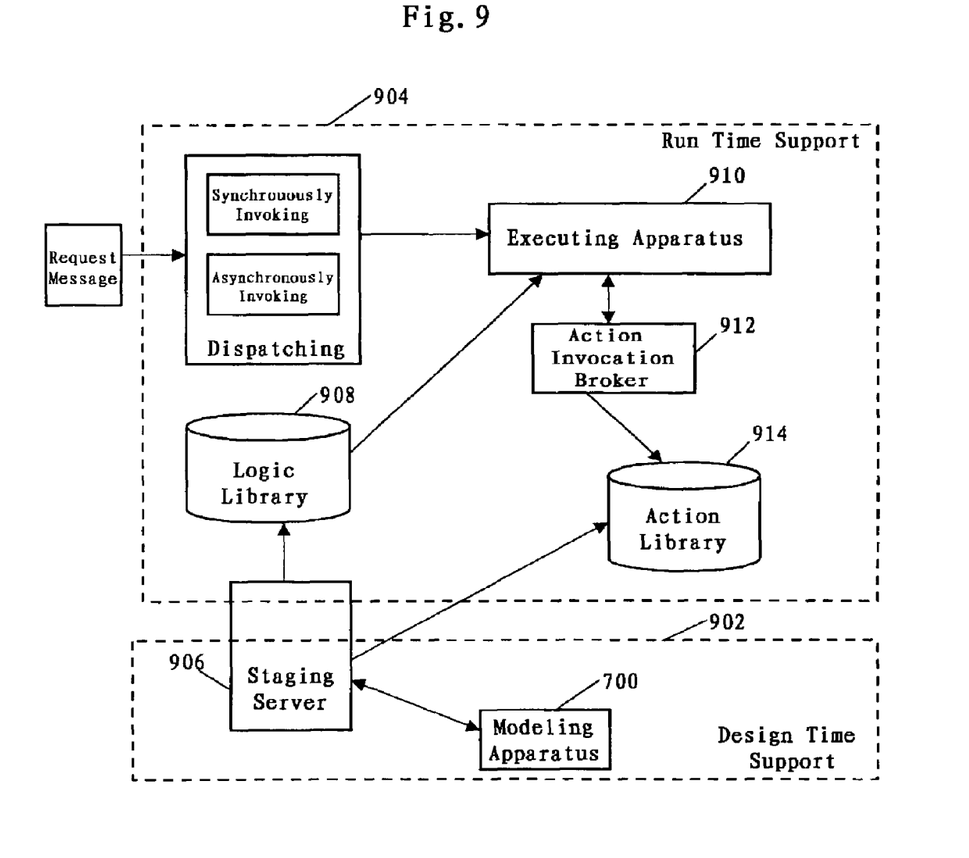
FIG. 9 is a schematic view showing a system employing the processing logic modeling apparatus and the processing logic executing apparatus of the invention.

As shown in FIG. 9, the user may design a new processing logic with the processing logic modeling apparatus 700 of the invention. The processing logic may be deployed to the logic library after it is confirmed to be usable through its simulation run on the staging server 906.

In the run time support 904, a processing logic could be invoked by receiving a request message through the execution engine invocation interface. The message dispatcher would pickup the message in the inbound queue, and bind the message to the corresponding processing logic, the logic script would then be loaded from the logic library 908 into the executing apparatus (engine) 910 kernel. And then the executing apparatus instantiates a processing logic instance by feeding the data contained in the business message. The logic would be executed on the executing apparatus by traversing the logic tree. Action invocation broker (AIB) 912 enables the executing apparatus 910 to invoke actions defined in the logic. AIB would retrieve action corresponding to invocation parameters from the action library 914 and then perform the invocation. When the tree contains sub-logic nodes, the executing apparatus may invoke sub-logics from the logic library. The executing apparatus may further provide Runtime Administration Console for monitoring the runtime status of the executing apparatus and managing the logic library.

From above description, it could be seen that the invention has the following advantages:

The annotated tree could meet most of the requirements of processing logic modeling. The invented modeling method is very easy to learn. It provides a clear tree structure view on the objectives of a process and its detailed tasks, which make it easy to understand by both business executives and IT staffs.

The hierarchical tree-style processing logic structure could facilitate the collaboration between business analyst and IT staff for process modeling. Only the leaf node on the tree will be attached with real action code. Business analyst could design the task breakdown structure first, IT staff would then work out the detailed data definition for every node. So it could help to bridge the gap between the business analyst and the IT staff, and maintain the consistency between business level design and IT implementation design.

Each branch of the processing logic tree is an atomic description on a set of tasks or procedures. So it is very easy to be componentized as a sub-logic, which could improve the atomic processing logic's reuseability and make the main logic is clear and easy to understand.

Taking use of the design tooling of the invention, to design a processing logic, no programming or script coding is required. Rather, drag and drop functions of each object in the tooling environment to define a process. Flexible graphic editing facilities are also provided. The logic XML script could be dynamically generated upon the graphic editing.

While the invention has been described with reference to specific embodiments disclosed herein, it is not confined to the details set forth herein, and this application is intended to cover all the variations or equivalents that are obvious to a person skilled in the art having read the specification. The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented processing logic modeling method for modeling a task, comprising:
    a decomposing step for decomposing said task into at least one level of sub-tasks;
    a tree structure forming step for forming a tree structure from said task and various levels of sub-tasks resulted from decomposing the task; and
    an annotating step for annotating nodes of the tree structure, the annotating representing execution instructions annotated at a first node of the tree structure with respect to executing the execution instructions at a second node of the tree structure wherein the first and second nodes are at different levels of the tree structure, thus obtaining a processing logic model for performing said task.

2. The method according to claim 1, wherein said tree structure forming step comprises: forming leaf nodes comprising at least one of action node and sub-logic node, wherein, the action node corresponds to atomic action program that could be invoked to execute as instructed by a leaf node, and the sub-logic node corresponds to sub-logic that could be invoked.

3. The method according to claim 2, wherein the step of forming leaf nodes comprises at least one of action node and sub-logic node, and further comprises:
   defining an interface description of the action node and/or sub-logic node; and
   binding implementation modules of the action node and the sub-logic node according to said interface description.

4. The method according to claim 1, wherein said annotating step comprises attaching at least one of following annotations to the first node of the tree structure with respect to executing at the second node of the tree structure:
   precondition defining a condition to be met for performing a corresponding node;
   postcondition defining the condition to be met for leaving the corresponding node;
   pre-task defining the task to be performed before performing the corresponding node;
   post-task defining the task to be performed before leaving the corresponding node; and
   a type of intermediate node, stipulating whether children of the intermediate node should be performed sequentially or in parallel.

5. A method for executing the processing logic established according to claim 1, comprising:
   traversing the tree structure according to annotations of nodes of the tree structure, and
   performing leaf nodes of the tree structure according to annotations of nodes of the tree structure of a different level than the leaf nodes, thus completing an execution of the task.

6. The method according to claim 5, wherein the leaf nodes of the tree structure comprises at least one of action node and sub-logic node, wherein, invoking atomic action program when executing the action node, and invoking sub-logic when performing the sub-logic node.

7. The method according to claim 5, wherein said annotations of nodes of the tree structure of a different level than the leaf nodes includes at least one of the following:
   precondition defining a condition to be met for performing a corresponding node;
   postcondition defining the condition to be met for leaving the corresponding node;
   pre-task defining the task to be performed before performing the corresponding node;
   post-task defining the task to be performed before leaving the corresponding node;
   a type of intermediate node, stipulating whether children of the intermediate node should be performed sequentially or in parallel;
   and the method further comprises:
   when the traversing reaches a node, checking its annotations, and determining whether to perform the node according to said precondition and whether to leave the node according to said postcondition, executing the pre-task before executing the node according to the pre-task, executing the post-task before leaving the node according to the post-task, and, according to a type of the node, determining whether a depth-first traversing algorithm or a broadness-first traversing algorithm should be performed with respect to the children of the node.

8. An article of manufacture comprising a non-transitory computer readable storage medium having computer readable program code means embodied therein for causing execution of the processing logic, the computer readable program code means in said article of manufacture comprising computer readable program code means for causing a computer to effect the steps of claim 5.

9. A program storage device readable by machine, tangibly embodying a program of instructions executable by the machine to perform method steps for executing the processing logic, said method steps comprising the steps of claim 5.

10. The method according to claim 5, wherein:
    the leaf nodes of the tree structure comprises at least one of action node and sub-logic node, wherein, invoking atomic action program when executing the action node, and invoking sub-logic when performing the sub-logic node;
    said annotations includes at least one of the following:
       precondition defining a condition to be met for performing a corresponding node;
       postcondition defining the condition to be met for leaving the corresponding node;
       pre-task defining the task to be performed before performing the corresponding node;
       post-task defining the task to be performed before leaving the corresponding node;
       a type of intermediate node, stipulating whether children of the intermediate node should be performed sequentially or in parallel;
    and the method further comprises:
    when the traversing reaches a node, checking its annotations, and determining whether to perform the node according to said precondition and whether to leave the node according to said postcondition, executing the pre-task before executing the node according to the pre-task, executing the post-task before leaving the node according to the post-task, and, according to a type of the node, determining whether a depth-first traversing algorithm or a broadness-first traversing algorithm should be performed with respect to children of the node.

11. An article of manufacture comprising a non-transitory computer readable storage medium having computer readable program code means embodied therein for causing modeling of a task, the computer readable program code means in said article of manufacture comprising computer readable program code means for causing a computer to effect the steps of claim 1.

12. The method according to claim 1, wherein:
    said tree structure forming step comprises: forming leaf nodes comprising at least one of action node and sub-logic node, wherein, the action node corresponds to atomic action program that could be invoked, and the sub-logic node corresponds to sub-logic that could be invoked;
    the step of forming leaf nodes comprises at least one of action node and sub-logic node, and further comprises:
       defining an interface description of the action node and/or sub-logic node, and
       binding implementation modules of the action node and the sub-logic node according to said interface description; and
    the annotating step comprises attaching at least one of following annotations:
       precondition defining a condition to be met for performing a corresponding node;
       postcondition defining the condition to be met for leaving the corresponding node;
       pre-task defining the task to be performed before performing the corresponding node;

post-task defining the task to be performed before leaving the corresponding node; and a type of intermediate node, stipulating whether children of the intermediate node should be performed sequentially or in parallel.

13. A processing logic modeling computer-implemented apparatus to model a task, comprising an editor comprising: a computer processor;

a tree editor, for editing a tree structure corresponding to a processing logic and showing how the task is decomposed into at least one level of sub-tasks;

an annotation editor, for editing annotations for nodes of the tree structure, the annotations representing execution instructions annotated at a first node of the tree structure with respect to executing the execution instructions at a second node of the tree structure wherein the first and second nodes are at different levels of the tree structure; and an interpreter, for mapping the tree and the annotations into script of the processing logic.

14. The apparatus according to claim 13, wherein, said editor further comprises a graphical user interface, on which various graphical elements are provided or defined by an user, graphics representing the tree and the annotations are edited with said tree editor and said annotation editor on the graphical user interface by using said graphical elements, and said interpreter mapping a predetermined graphical element into a predetermined script section.

15. The apparatus according to claim 14, wherein said graphical elements includes graphical elements corresponding to the tree and graphical elements corresponding to the annotations.

16. The apparatus according to claim 14, wherein said graphical elements includes formatted text.

17. The apparatus according to claim 13, further comprising a debugger for simulatively performing the processing logic, either automatically or manually, either globally or locally, so as to find out and display a potential bug in a resulted processing logic.

18. A computer program product comprising a non-transitory computer readable storage medium having computer readable program code means embodied therein for causing modeling of a task, the computer readable program code means in said computer program product comprising :

computer readable program code means for causing a computer to effect a tree editor, for editing a tree structure corresponding to a processing logic and showing how the task is decomposed into at least one level of sub-tasks;

computer readable program code means for causing a computer to effect an annotation editor, for editing annotations for nodes of the tree structure, the annotations representing execution instructions annotated at a first node of the tree structure with respect to executing the execution instructions at a second node of the tree structure wherein the first and second nodes are at different levels of the tree structure; and computer readable program code means for causing a computer to effect an interpreter, for mapping the tree structure and the annotations into script of the processing logic.

* * * * *